United States Patent [19]

Cho et al.

[11] Patent Number: 5,196,491
[45] Date of Patent: Mar. 23, 1993

[54] LIVING CATIONIC POLYMERIZATION OF ALKYL VINYL ETHERS

[75] Inventors: Chang Cho, Wilmington, Del.; Ben-Ami Feit, Tel Aviv, Israel; Owen W. Webster, Wilmington, Del.

[73] Assignee: E. I. Du Pont de Nemours and Company, Wilmington, Del.

[21] Appl. No.: 276,352

[22] Filed: Nov. 25, 1988

[51] Int. Cl.$^5$ .............................................. C08F 4/52
[52] U.S. Cl. ................................. 526/185; 526/193; 526/194; 526/204; 526/209; 526/221; 526/225; 526/234; 526/263; 526/264; 526/332; 526/334; 526/346; 526/347; 526/347.1; 526/347.2
[58] Field of Search .............. 526/204, 225, 234, 185, 526/193, 194, 209, 221

[56] References Cited

U.S. PATENT DOCUMENTS 4,393,199 7/1983 Manser .................................. 528/408
4,696,988 9/1987 Higashimura et al. .............. 526/220

FOREIGN PATENT DOCUMENTS 206756 12/1986 European Pat. Off. .

OTHER PUBLICATIONS

T. Higashimura and M. Sawamoto; Adv. Polym. Sci., 1984, 62, 50–94.
M. Miyamoto, M. Sawamoto, and T. Higashimura; Macromol., 1984, 17, 265–268.
S. Aoshima and T. Higashimura Polym. Bull., 1986, 15, 417–423.
T. Higashimura, Y., Kishimoto, and S. Aoshima; Poly. Bull., 1987, 18, 111–115.
R. Faust and J. P. Kennedy; Polym. Bull., 1986, 15, 317–323.

Primary Examiner—Bernard Lipman
Attorney, Agent, or Firm—Barbara C. Siegell

[57] ABSTRACT

This invention relates to a process for the living cationic polymerization of vinylic unsaturated compounds containing electron donating substituents resulting in polymers of narrow molecular weight distribution.

20 Claims, No Drawings

LIVING CATIONIC POLYMERIZATION OF ALKYL VINYL ETHERS

FIELD OF THE INVENTION

This invention relates to a process for the living cationic polymerization of vinylic unsaturated compounds containing electron donating substitutes to polymers of narrow molecular weight distribution.

BACKGROUND OF THE INVENTION

Living polymerization allows for the synthesis of new polymers and oligomers with specialized structures. A number of recent advances have occurred in polymerization by cationic mechanisms to yield living polymers, where it was previously thought that obtaining living characteristics was unlikely, except for a few ring-opening polymerization systems, due to the reactivity or instability of the ions involved.

T. Higashimura and M. Sawamoto; Adv. Polym. Sci., 1984, 62, 50-94, review the attempts at living cationic polymerization of vinyl monomers and state that until recently it was considered "beyond our reach." They teach away from using oxo acids, such as sulfonic acids, because they believe that the acid derived counterions react with the propagating cations and thereby terminate the polymerization. For example, they show in Table 11 that dimer instead of polymer is produced when p-methoxystyrene is reacted with either $CH_3SO_3H$ or $CF_3SO_3H$. They disclose the use of an $HI/I_2$ initiating system to polymerize isobutyl vinyl ether in n-hexane. They claim this polymerization system to be the first example of living cationic polymerization of vinyl compounds.

M. Miyamoto, M. Sawamoto, and T. Higashimura; Macromol., 1984, 17, 265-268, show that living polymerization of isobutylvinyl ether using $HI/I_2$, $I_2$, or HI as initiators, does not occur in a polar solvent such as $CH_2Cl_2$.

S. Aoshima and T. Higashimura; Polym. Bull., 1986, 15, 417-423, disclose the use of esters as Lewis base modifiers for $EtAlCl_2$. These systems are used as initiators for the living cationic polymerization of vinyl ethers.

T. Higashimura, Y. Kishimoto, and S. Aoshima, Polym. Bull., 1987, 18, 111-115, disclose the use of an $EtAlCl_2$/dioxane (basic compound) initiating system for the living cationic polymerization of vinyl monomers. A small amount of water is added to the initiating system.

R. Faust and J. P. Kennedy; Polym. Bull., 1986, 15, 317-323, describe the living carbocationic polymerizations of isobutene using initiating complexes of organic esters with Lewis acids.

EP 206, 756, discloses the use of complexes of Lewis acids and organic acids or esters as catalysts for the living polymerization of olefins and diolefins.

JP J6 0228-509, discloses the preparation of polyalkenyl ethers by living polymerization using as catalysts iodine and optionally HI.

U. S. Pat. No. 4,393,199 discloses a method of polymerizing monomers capable of cationic polymerization by using an adduct consisting of a preinitiator precursor and a catalyst, to react with the monomer and produce a polymer of low polydispersity.

U. S. Pat. No. 4,696,988 discloses the use of $HI/I_2$ initiating systems to polymerize isopropenylphenyl glycidyl ethers. The use of $CF_3SO_3H$ is shown to be ineffective.

It is difficult to predict which initiator/Lewis base combinations will result in a living cationic polymerization of a vinyl monomer. For example, S. Aoshima and T. Higashimura, op. cit., show that living polymerizations of 2-vinyloxyethyl benzoate and 2-vinyloxyethyl methacrylate monomers, where the ester functioning as a Lewis base can be incorporated within its structure, can be conducted using $EtAlCl_2$ but not with $BF_3OEt_2$.

The present invention provides a process for the cationic polymerization of vinylic unsaturated compounds using a proton or carbenium or siliconium ion source, and/or Lewis acids; in combination with selected Lewis base.

SUMMARY OF THE INVENTION

The present invention provides a process for the preparation of polymers by cationic polymerization of selected vinylic unsaturated compounds using a suitable initiator, examples of which include a combination of a proton source (HA) and a Lewis base (LB); HA, Lewis acid (LA) and LB; carbenium or siliconium ion source (CS) and LB or CS, LA and LB. Examples of HA include; $CF_3SO_3H$, $H_2SO_4$, $FSO_3H$, $HClO_4$, $HCO_2R$ (where R is $C_{1-4}$ alkyl), HOR, HSR, and $H_2O$. Examples of LA include; $BF_3$, $RAlCl_2$, $PF_5$, $AsF_5$, and $SbF_5$. When the HA used is weakly acidic, e. g. $HCO_2R$, HOR, HSR, or $H_2O$, a Lewis acid is necessary for polymerization to occur. Examples of LB include; $CH_3SR^1$, where $R_1$ is a straight chain $C_{1-4}$ alkyl, $(CH_3CH_2)_2S$, $(CH_3CH_2CH_2)_2S$, $CH_3CH_2SH$, $(CH_3)_2SO$, $CH_3SCH_2SCH_3$, $CH_3SCH_2CH_2SCH_3$, tetrahydrofuran (THF), tetrahydrothiophene diisopropyl sulfide, or p-dioxane. Examples of carbenium and siliconium ion sources (CS) include; $CF_3SO_3R$, $CF_3SO_3SiR_3$, $R^2CH(OR)_2$, $R^2C(OR)_3$ and $R^2C(O)H$, where $R^2$ is phenyl or $C_{1-6}$ alkyl and R is as defined above.

The polymerization reaction proceeds according to the following formula:

where $n^{(I-IV)}$ denotes the proportions of the number of moles of reactants; n=1-200, $n^I$=0-1, $n^{II}$=0-10, $n^{III}$=1-50, and $n^{IV}$=0-1 with the proviso that $n^I$+$n^{IV}$=1; and X is an electron donating group such as a $C_{1-6}$ alkoxy group.

DETAILS OF THE INVENTION

The monomers useful in the invention process include, but are not limited to, styrenes with para alkyl or alkoxy substiuents, where the alkyl or alkoxy groups contain $C_1$ to $C_6$ carbon atoms; alkyl vinyl ethers or aralkyl vinyl ethers, where the alkyl groups contain one to twenty carbon atoms, and optionally contain halogen atoms such as chlorine, fluorine or bromine, or ether linkages; and N-vinylcarbazole. Preferably the monomer is a, $C_1$ to $C_6$ alkyl vinyl ether. Most preferred are methyl vinyl ether, ethyl vinyl ether, n-butyl vinyl ether, or isobutyl vinyl ether. The monomers used herein are either known compounds or can be prepared by known methods.

In the invention process, a monomer is polymerized in a suitable solvent, preferably dichloromethane or hexane, in an inert gas atmosphere, with precautions being taken to exclude water, except when water is deliberately added as part of the initiator system, at temperatures of about −80° C. to about 0° C. Pressure is not critical, but atmospheric pressure is preferred. Preferred HA's, LA's and CS's include; $FSO_3H$, $SbF_5$, $CF_3SO_3Si(CH_3)_3$, $BF_3$, $CF_3SO_3H$, $PhC(O)H$, $PhCH(OCH_3)_2$. A Lewis base is a necessary component of the catalyst system in order to obtain a narrow molecular weight distribution (MWD) polymer, indicative of a living polymerization. It is believed that the polymer products of this invention are examples of living cationic polymerization, as evidenced by the dependence of $M_n$ on $[M]_o/[I]_o$ and the narrow MWD of the products. Because the polymers of this invention are living, they can be used to prepare block copolymers. Lewis bases used in the process of this invention are $CH_3SR^1$, where $R^1$ is a straight chain $C_{1-4}$ alkyl, $(CH_3CH_2)_2S$, $(CH_3CH_2CH_2)_2S$, $CH_3CH_2SH$, $(CH_3)_2SSCH_2SCH_3$, $CH_3SCH_2CH_2SCH_3$, diisopropyl sulfide, p-dioxane, or tetrahydrofuran. Preferred Lewis bases are $(CH_3)_2S$, $(CH_3CH_2)_2S$, $CH_3CH_2SH$, $(CH_3S)_2CH_2$, tetrahydrothiophene or $(CH_3)_2SO$. Preferably, the molar ratio of the Lewis base to the initiator should be greater than 6, although ratios as low as 1.1 may be used. The MWD decreases with an increase of [LB]/[Initiator].

The polymers of this invention generally have a narrow molecular weight distribution. The polydispersity is in the range of about 1.0 to about 2.4.

The polymers of this invention are useful for coatings, sealing materials, and adhesives.

In the following embodiments of the invention, temperatures are in degrees Celsius unless otherwise specified. Molecular weights (weight $\overline{M}_w$ and number $\overline{M}_n$ average) were determined by gel permeation chromatography (GPC); polydispersity, D, is given by the ratio of $\overline{M}_w/\overline{M}_n$.

The most preferred embodiments are represented by examples: 1, 3, 4, 17, 23, and 25.

EXAMPLES

The vinyl ethers used were purified by stirring for 48 h with KOH pellets, followed by refluxing over $CaH_2$, and finally distillation from $CaH_2$. This procedure was repeated a minimum of three times. Methylene chloride (EM Science, 99.9%) and hexane (Phillips, Spectro Grade) were refluxed over $CaH_2$ and distilled from $CaH_2$; this procedure was repeated a minumum of three times. Sometimes hexane was purified by distillation from a solution containing living polystyrene. Dioxane (Baker, Baker-Analyzed) was used after drying over molecular sieves. Tetrahydrofuran (EM Science, 99.9%) was used after distillation over sodium-potassium alloy. Methyl sulfide (Aldrich, gold label, anhydrous, 99+%), ethyl sulfide (Aldrich, 98%), n-propyl sulfide (Aldrich, 97%), isopropyl sulfide (Aldrich, 98%), bis(methylthio)methane (Aldrich, 99+%), ethanethiol (Aldrich, 97%), tetrahydrothiophene (Aldrich, 99%) benzaldehyde (Aldrich, 99+%) benzaldehyde dimethyl acetal (Aldrich, 99%), DMSO (Aldrich, gold label, anhydrous, 99+%), fluorosulfonic acid (Columbia, distilled), trifluoromethanesulfonic acid (fluka, purum, >98%), boron trifluoride-methyl sulfide complex (Aldrich), trimethylsilyl triflate (Aldrich, 99%), Magic acid (Aldrich, 25%, $4FSO_3H.SbF_5$), and oleum (Baker, 20%) were used without further purification.

EXAMPLES 1-28

Living Cationic Polymerization of Vinyl Ethers

Method A

To a three-necked RB flask, which had been oven-dried, equipped with magnetic stirring, a dropping funnel, and under an argon atmosphere, was added solvent in varying amounts depending on the monomer solution concentration, such that the total solvent volume equaled 120–125 mL. The solvent was then cooled to the indicated temperature, and a solution of an initiator consisting of a proton source (HA), or HA and a Lewis acid, or a carbenium or siliconium ion source, or a carbenium ion source and a Lewis acid, and Lewis base was added, followed by stirring for 10–15 min. All of the monomer was added dropwise to this solution of an initiator and Lewis base. Stirring was continued for 3–15 h when using $CH_2Cl_2$ as solvent and for 6–24 h when using hexane as solvent. The living polymerization was quenched by adding a chilled solution of a 10% t-butylamine/methanol solution. The polymer was isolated by stripping solvent (120–125 mL).

Method B

The initiator solution was injected in one portion into the cooled solution of the monomer and Lewis base. The rest of the procedure was the same as Method A.

Results shown in Tables 1 and 2 are for the preferred Lewis bases. Results of polymerizations under inoperative conditions for producing living polymers are shown in Tables 3 and 4.

TABLE 1

| Ex. No. | Solvent | Reaction Method | Temp. | Initiator | Mmol | Lewis Base | Mmol |
|---|---|---|---|---|---|---|---|
| 1 | $CH_2Cl_2$ | A | −30° C. | $Me_3SiTf$ | 0.9 | $Me_2S$ | 30 |
| 2 | " | " | " | " | " | " | " |
| 3 | Hexane | " | " | " | " | " | " |
| 4 | $CH_2Cl_2$ | " | " | " | " | " | " |
| 5 | " | " | " | $TfH$ | " | " | 7.2 |
| 6 | " | " | " | $Me_3SiTf$ | " | $Et_2S$ | 15 |
| 7 | " | " | " | $TfH$ | " | " | " |
| 8 | " | " | " | " | " | $Me_2SO$ | 8.0 |
| 9 | " | " | −60° C. | " | " | " | 7.2 |
| 10 | Hexane | B | −5 to 0° C. | $EtAlCl_2$ $H_2O$ | 1.0 0.83 | $Me_2S$ | 60 |
| 11 | $CH_2Cl_2$ | A | −30° C. | $BF_3.Me_2S$ MeOH | 0.94 1.0 | " | 26 |
| 12 | " | " | " | $BF_3.Me_2S$ $H_2O$ | 0.94 0.50 | " | " |
| 13 | " | " | " | $BF_3.Me_2S$ HOAc | 0.94 1.0 | " | " |
| 14 | " | " | " | $BF_3.Me_2S$ $PhCH(OMe)_2$ | 0.94 1.0 | " | " |
| 15 | " | " | " | $BF_3.Me_2S$ | 0.94 | $EtSH^b$ | 4.5 |

TABLE 1-continued

| Ex. No. | Solvent | Reaction Method | Temp. | Initiator | Mmol | Lewis Base | Mmol |
|---|---|---|---|---|---|---|---|
| 16 | " | " | −70° C. | $T_fH$ | 1.8 | $(CH_3S)_2CH_2$ | 3.7 |
| 17 | " | B | −30° C. | $BF_3Et_2O$ | 5 | $Me_2S$ | 30 |
|  |  |  |  | PhC(O)H | 1.0 |  |  |
| 18 | " | " | −30° C. | $T_fH$ | 1.0 | $(n-Pr)_2S$ | 30 |
| 19 | " | " | " | " | 1.0 | $(iso-Pr)_2S$ | 16.7 |
| 20 | " | " | " | $BF_3OEt_2$ | 1.0 | Dioxane | 15 |
|  |  |  |  | $PhCH(OMe)_2$ | 0.7 |  |  |
| 21 | " | " | 0° C. | $BF_3OEt_2$ | 1.0 | " | " |
|  |  |  |  | $PhCH(OMe)_2$ | 0.7 |  |  |
| 22 | " | " | −30° C. | $BF_3OEt_2$ | 7 | THF | 42 |
|  |  |  |  | $PhCH(OMe)_2$ | 0.7 |  |  |
| 23 | " | " | " | $BF_3OEt_2$ | 14 | $Me_2S$ | 42 |
|  |  |  |  | $PhCH(OMe)_2$ | 0.7 |  |  |
| 24 | " | " | " | $FSO_3H$ | 1.0 | " | 30 |
| 25 | " | " | " | $FSO_3H.SbF_5$ | 1.0 | " | 26 |
| 26 | " | " | " | $H_2SO_4$ | 0.8 | " | 10 |
|  |  |  |  | $SO_3$ | 0.2 |  |  |
| 27 | " | " | " | $T_fH$ | 0.68 | Tetrahydro thiophene | 17.0 |
| 28 | " | " | " | $T_fH$ | 25 | $Me_2S$ | 133 |

$^aT_f = CF_3SO_3-$
$^b$EtSH serves a dual function as a Lewis base and as a proton source.

TABLE 2

| Ex. No. | R of $RO-CH=CH_2$ | Mmol | Product Yield | $\overline{M}_w$ | $\overline{M}_n$ | $\overline{M}_w/\overline{M}_n$ |
|---|---|---|---|---|---|---|
| 1 | Isobutyl | 65 | 6.76 g | 6750 | 6640 | 1.02 |
| 2 | " | 130 | 13.43 | 13800 | 11700 | 1.18 |
| 3 | " | 260 | 5.76 | 10100 | 9340 | 1.08 |
| 4 | " | 130 | 13.60 | 17700 | 16800 | 1.05 |
| 5 | " | " | 13.29 | 10100 | 8290 | 1.22 |
| 6 | " | " | 14.22 | 14400 | 11400 | 1.26 |
| 7 | " | " | 13.56 | 13600 | 11100 | 1.24 |
| 8 | " | " | 14.30 | 7420 | 4650 | 1.60 |
| 9 | Ethyl | " | 10.1 | 5090 | 3100 | 1.64 |
| 10 | Isobutyl | 65 | 5.83 | 15600 | 12900 | 1.21 |
| 11 | " | " | 6.89 | 2830 | 1350 | 2.10 |
| 12 | " | " | 6.19 | 9340 | 7690 | 1.21 |
| 13 | " | " | 6.18 | 3390 | 2820 | 1.20 |
| 14 | " | " | 6.78 | 6190 | 4820 | 1.28 |
| 15 | " | " | 6.67 | 3270 | 2250 | 1.45 |
| 16 | Ethyl | 260 | 19.67 | 27700 | 19200 | 1.44 |
| 17 | Isobutyl | 61 | 6.82 | 13700 | 13400 | 1.02 |
| 18 | " | 65 | 6.72 | 12400 | 7860 | 1.58 |
| 19 | " | " | 6.66 | 14100 | 7260 | 1.95 |
| 20 | " | 61 | 6.41 | 21200 | 9100 | 2.34 |
| 21 | " | " | 6.31 | 23000 | 9740 | 2.37 |
| 22 | " | " | 6.18 | 19900 | 9810 | 2.03 |
| 23 | " | " | 6.84 | 9120 | 9280 | 0.98 |
| 24 | " | " | 6.38 | 6440 | 3790 | 1.70 |
| 25 | " | " | 6.58 | 3860 | 3670 | 1.05 |
| 26 | " | " | 5.98 | 717 | 408 | 1.75 |
| 27 | " | " | 6.26 | 8180 | 7470 | 1.10 |
| 28 | Methyl | 550 | 30.8 | 1190 | 1030 | 1.16 |

TABLE 3

| Experiment No. | Solvent | Reaction Method | Temp. | Initiator | Mmol | Lewis Base | Mmol |
|---|---|---|---|---|---|---|---|
| 1 | $CH_2Cl_2$ | A | −30 | $T_fH$ | 0.9 | p-Dithiane | 2.7 |
| 2 | " | " | " | " | " | $(i-Pr)_2S$ | 7.2 |
| 3 | " | " | 0 | " | " | Pyridine Oxide | 1.0 |
| 4 | " | " | −30 | $T_fH$ | " | $Ph_2SO$ | 3.6 |
| 5 | " | " | " | " | " | $CH_3CO_2Et$ | 15.0 |
| 6 | " | " | " | " | " | $CH_3CN$ | " |
| 7 | " | " | " | " | " | $PhCO_2Et$ | " |
| 8 | " | " | " | $Me_3SiT_f$ | 1.80 | p-Dioxane | 60 |
| 9 | " | " | " | " | " | $CH_3I$ | 15.0 |
| 10 | " | " | " | " | " | $Me_3CI$ | " |

TABLE 4

| Experiment No. | R of $RO-CH=CH_2$ | Mmol | Product Yield | $\overline{M}_w$ | $\overline{M}_n$ | $\overline{M}_w/\overline{M}_n$ |
|---|---|---|---|---|---|---|
| 1 | i-Bu | 130 | 13.45 | 35100 | 1930 | 18.2 |
| 2 | " | " | 13.18 | 27900 | 3520 | 7.94 |
| 3 | " | " | 13.46 | 18200 | 2590 | 7.00 |
| 4 | " | " | 13.32 | 12700 | 745 | 17.1 |
| 5 | " | " | 13.94 | 18900 | 2560 | 7.40 |
| 6 | " | " | 13.02 | 17400 | 2430 | 7.16 |
| 7 | " | " | 14.37 | 20100 | 2470 | 8.16 |
| 8 | " | " | 13.54 | 34300 | 5150 | 6.66 |
| 9 | " | 65 | 7.33 | 32100 | 3390 | 9.47 |
| 10 | " | " | 7.19 | 33100 | 5840 | 5.67 |

EXAMPLE 29

Effect of [LB]/[Initiator] on MWD

The MWD was found to be dependent on the [LB]/[Initiator] ratio. Results of experiments for the polymerization of isobutyl vinyl ether in the presence of $(CH_3)_2S$ that demonstrated this are shown in Table 5. Experiments A-G were run under the following conditions: $I=T_fH$ (0.90 mmol), solvent=$CH_2Cl_2$, reaction temperature=−30° C., yields yields-quantitative. Experiments H-O were run under the following conditions: $I=Me_3SiT_f$ (0.90 mmol), solvent=$CH_2Cl_2$, reaction temperature=−30° C., yields-quantitative.

TABLE 5

$\bar{M}_w/\bar{M}_n$ Dependence on [LB]/[I]

| Experiment | [LB]/[I] | $\bar{M}_w/\bar{M}_n$ |
|---|---|---|
| A | 2 | 1.74 |
| B | " | 1.79 |
| C | 4 | 1.58 |
| D | 8 | 1.32 |
| E | " | 1.34 |
| F | 16.7 | 1.23 |
| G | " | 1.21 |
| H | 0 | 5.62 |
| I | " | 7.71 |
| J | 4 | 1.56 |
| K | " | 1.68 |
| L | 16.7 | 1.38 |
| M | " | 1.33 |
| N | 33.3 | 1.18 |
| O | " | 1.20 |

EXAMPLE 30

$\bar{M}_n$ Dependence on $[M]_o/[I]_o$

Isobutyl vinyl ether was polymerized by $Me_3SiT_f$ (0.90 mmol) in the presence of $Me_2S$ (30 mmol) using $CH_2Cl_2$ as solvent at a reaction temperature of $-30°$ C. using Experimental Method B described above. Quantitative yields of polymers were obtained. The results of these experiments are shown in Table 6, A–H. A similar series was done with triflic acid initiator; the results of these experiments are shown in Table 6, I–N.

TABLE 6

Dependence of $\bar{M}_n$ on $[M]_o/[I]_o$

| Experiment | $[M]_o/[I]_o$ | $\bar{M}_n$ (calc)[1] | $\bar{M}_n$ | $\bar{M}_w/\bar{M}_n$ |
|---|---|---|---|---|
| A | 36.1 | 3615 | 7440 | 1.03 |
| B | " | " | 9390 | 1.06 |
| C | 72.2 | 7231 | 13600 | 1.09 |
| D | " | " | 17900 | 1.11 |
| E | 108.3 | 10846 | 23100 | 1.14 |
| F | " | " | 32600 | 1.09 |
| G | 144.4 | 14462 | 46600 | 1.15 |
| H | " | " | 43800 | 1.15 |
| I | 32.5 | 3255 | 1740 | 1.08 |
| J | " | " | 1950 | 1.07 |
| K | 65 | 6510 | 4160 | 1.04 |
| L | " | " | 4300 | 1.0 |
| M | 97.5 | 9765 | 6520 | 1.04 |
| N | " | " | 6130 | 1.12 |

[1] $\bar{M}_n$ (calc) = $[M]_oM_1/[I]_o$
Reaction time: [a]1 h, [b]2 h, [c]3 h.

COMPARATIVE EXPERIMENT

Effect of $H_2O$ on the Polymerization System

The addition of $H_2O$ to the isobutyl vinyl ether/$Me_3SiT_f$/$Me_2S$/$CH_2Cl_2$ polymerization system resulted in a decrease of $\bar{M}_w$ and an increase of $\bar{M}_w/\bar{M}_n$. Water was completely consumed in a very efficient chain transfer to monomer reaction as can be seen from the fact that $\bar{M}_n = \bar{M}_n$ (calc) = $M_o/([Me_3SiT_f]_o + [H_2O])$. 1

The effect of ethanol is similar. These results indicate that polyalkyl vinyl ethers having controlled $\bar{M}_w$ and $\bar{M}_w/\bar{M}_n$ in the range of 1.1–1.5, can be obtained by controlling the $[Me_3SiT_f]/[H_2O]$ ratio.

TABLE 7

Effect of Added Water

| Experiment | [H$_2$O] (mmol) | [Me$_3$SiT$_f$] + [H$_2$O] (mmol) | $\bar{M}_n$ (calc) | $\bar{M}_n$ | $\bar{M}_w/\bar{M}_n$ | $10^4$ $(1/\bar{M}_n)$ |
|---|---|---|---|---|---|---|
| A | — | 0.9 | 7234 | 7510 | 1.04 | 1.33 |
| B | " | " | " | 9370 | 1.03 | 1.07 |
| C | 0.9 | 1.8 | 3617 | 3590 | 1.27 | 2.79 |
| D | " | " | " | 3810 | 1.25 | 2.62 |
| E | 1.8 | 2.7 | 2422 | 2340 | 1.42 | 4.27 |
| F | " | " | " | 1810 | 1.90 | 5.52 |
| G | 3.6 | 4.5 | 1607 | 1360 | 2.86 | 7.35 |
| H | " | " | " | 1060 | 2.86 | 9.43 |

Although preferred embodiments of the invention have been illustrated and described hereinabove, it is to be understood that there is no intent to limit the invention to the precise constructions herein described. Rather, it is to be further understood that the right is reserved to all changes and modifications coming within the scope of the invention as defined by the appended claims.

What is claimed is:

1. A process for the living cationic polymerization of vinylic unsaturated monomers containing electronic donating substituents, comprising contacting said vinylic unsaturated monomers under polymerizing conditions at a temperature of about $-80°$ C. to about $0°$ C. in a suitable solvent, in the presence of an initiating combination consisting essentially of a Lewis base selected from the group consisting of $CH_3SR^1$, wherein: $R^1$ is straight chain $C_1$ to alkyl; $(CH_3CH_2)_2S$; $(CH_3CH_2CH_2)_2S$; $(CH_3)_2SSCH_2SCH_3$; $CH_3CH_2SH$; $(CH_3)_2SO$; $CH_3SCH_2SCH_3$; $CH_3SCH_2CH_2SCH_3$; tetrahydrothiophene: tetrahydrofuran: diisopropyl sulfide: and p-dioxane, and a second component selected from: a proton source; a proton source and a Lewis acid; a carbenium or siliconium ion source; and a carbenium or siliconium ion source and a Lewis acid; provided that when the Lewis base is dioxane, the Lewis acid $RAICL_2$, where R is $C_1$ to $C_4$ alkyl, is not present.

2. The process of claim 1 wherein the initiating combination is a proton source and a Lewis base.

3. The process of claim 1 wherein the initiating combination is a proton source, Lewis acid and a Lewis base.

4. The process of claim 1 wherein the initiating combination is a carbenium ion or siliconium ion source and a Lewis base.

5. The process of claim 4 wherein the initiating combination is a siliconium ion source and a Lewis base.

6. The process of claim 4 wherein the initiating combination is a carbenium ion source and a Lewis base.

7. The process of claim 1 wherein the initiating combination is a carbenium or siliconium ion source, a Lewis acid and a Lewis base.

8. The process of claim 1 or 2 or 3 or 4 or 5 or 6 or 7 wherein the product is a living polymer.

9. The process of claim 8 where the vinylic unsaturated monomers are selected from the group of monomers consisting of styrenes with para alkyl or alkoxy groups containing $C_1$ to $C_6$ carbon atoms, alkyl vinyl ethers or aralkyl vinyl ethers, where the alkyl groups can contain one to twenty carbon atoms, and optionally halogen atoms or ether linkages, and N-vinyl carbazole.

10. The process of claim 8 wherein the monomer used is selected from the group consisting of methyl vinyl ether, ethyl vinyl ether, n-butyl vinyl ether, or isobutyl vinyl ether.

11. The process of claim 9 or claim 10 wherein the solvent is selected from the group comprising dichloromethane or hexane.

12. The process of claim 11 carried on in an inert gas atmosphere.

13. The process of claim 12 carried on in a water free atmosphere.

14. The process of claim 12 carried out in the presence of water.

15. The process of claim 13 or claim 14 conducted at atmospheric pressure.

16. The process of claim 15 wherein the molar ratio of the Lewis base to the initiator is in excess of 6 to 1.

17. The process of claim 2 wherein the proton source is selected from the group consisting of $CF_3SO_3H$, $H_2SO_4$, $FSO_3H$, and $HClO_4$.

18. The process of claim 3 wherein the proton source is selected from the group consisting of $HCO_2R$ (where R is $C_1$–$C_4$ alkyl), HOR, HSR and $H_2O$ and the Lewis acid is selected from the group consisting of $BF_3$, $RAlCl_2$, $PF_5$ and $SbF_5$.

19. The process of claim 17 or claim 18 wherein the Lewis Base is selected from the group consisting of $CH_3SR^1$, wherein: $R^1$ is straight chain $C_1$ to $C_4$ alkyl; $(CH_3CH_2)_2S$; $(CH_3CH_2CH_2)_2S$; $(CH_3)_2SSCH_2SCH_3$; $CH_3CH_2SH$; $(CH_3)_2SO$; $CH_3SCH_2SCH_3$; $CH_3SCH_2CH_2SCH_3$; tetrahydrothiophene; tetrahydrofuran; diisopropyl sulfide; and p-dioxane.

20. The process of claim 4 wherein the carbenium and siliconium ion sources are selected from the group consisting of $CF_3SO_3R$, $CF_3SO_3SiR_3$, $R^2CH(OR)_2$, $R^2C(OR)_3$ and $R^2C(O)H$, where $R^2$ is phenyl or $C_1$–$C_6$ alkyl, and R is as defined in claim 18.

* * * * *